United States Patent
Haehara et al.

(10) Patent No.: US 9,458,776 B2
(45) Date of Patent: Oct. 4, 2016

(54) ABNORMALITY DIAGNOSIS DEVICE AND AN ABNORMALITY DIAGNOSIS METHOD FOR A VARIABLE VALVE MECHANISM

(71) Applicant: Mazda Motor Corporation, Aki-gun, Hiroshima (JP)

(72) Inventors: Hiroshi Haehara, Hatsukaichi (JP); Daishi Ikeda, Hatsukaichi (JP); Takahiro Kono, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 17 days.

(21) Appl. No.: 14/590,999

(22) Filed: Jan. 7, 2015

(65) Prior Publication Data

US 2015/0198104 A1  Jul. 16, 2015

(30) Foreign Application Priority Data

Jan. 16, 2014  (JP) .................................. 2014-006053

(51) Int. Cl.
*F02M 69/04*  (2006.01)
*F02D 41/00*  (2006.01)
(Continued)

(52) U.S. Cl.
CPC ....... *F02D 41/0052* (2013.01); *F02D 13/0265* (2013.01); *F02D 41/0062* (2013.01); *F02D 41/123* (2013.01); *F02D 41/1446* (2013.01); *F02D 41/1448* (2013.01); *F02D 41/18* (2013.01); *F02D 41/221* (2013.01); *F02D 41/30* (2013.01); *G01M 15/05* (2013.01); *G01M 15/106* (2013.01); *F02D 41/0007* (2013.01); *F02D 41/0047* (2013.01); *F02D 2041/001* (2013.01); *F02D 2041/228* (2013.01);

(Continued)

(58) Field of Classification Search
CPC ..... Y02T 10/18; F02D 41/221; F02D 41/22; F02D 17/04; F01L 2800/11
USPC ............ 123/568.12–568.32, 90.23, 672, 445
See application file for complete search history.

(56) References Cited

U.S. PATENT DOCUMENTS 4,960,083 A * 10/1990 Seki ........................ F01L 1/267
123/90.16
5,140,810 A * 8/1992 Kuroda ................... F01N 3/227
60/274

(Continued)

FOREIGN PATENT DOCUMENTS

JP          06317114 A    11/1994
JP       2014006053 A     1/2014

*Primary Examiner* — Marguerite McMahon
*Assistant Examiner* — James Kim
(74) *Attorney, Agent, or Firm* — Alleman Hall McCoy Russell & Tuttle LLP

(57) ABSTRACT

Abnormality diagnosis device for a variable valve mechanism configured to open an exhaust valve even during an intake stroke and capable of selecting a first mode wherein the exhaust valve only opens during an exhaust stroke, or a second mode wherein the exhaust valve opens during both an exhaust stroke and an intake stroke. The abnormality diagnosis by the device determines the mechanism is abnormal when a difference between an exhaust gas returning amount calculated to recirculate from an exhaust passage into a cylinder in the second mode based on intake air amounts in the first and second modes, and an exhaust gas returning amount estimated to recirculate from an exhaust passage in the second mode based on an exhaust gas pressure, exceeds a diagnosis threshold value. The higher an exhaust gas pressure is, the larger an exhaust gas returning amount is estimated to be.

6 Claims, 8 Drawing Sheets

(51) Int. Cl.

| | | |
|---|---|---|
| *F02D 41/30* | (2006.01) | |
| *G01M 15/10* | (2006.01) | |
| *F02D 41/12* | (2006.01) | |
| *F02D 41/14* | (2006.01) | |
| *F02D 41/18* | (2006.01) | |
| *F02D 41/22* | (2006.01) | |
| *G01M 15/05* | (2006.01) | |
| *F02D 13/02* | (2006.01) | |

(52) U.S. Cl.
CPC . *F02D2200/0406* (2013.01); *F02D 2200/101* (2013.01); *Y02T 10/18* (2013.01); *Y02T 10/47* (2013.01)

(56) References Cited

U.S. PATENT DOCUMENTS

| | | | | |
|---|---|---|---|---|
| 5,461,569 | A * | 10/1995 | Hara | F02D 41/1495 |
| | | | | 123/198 D |
| 6,085,732 | A * | 7/2000 | Wang | F02D 41/22 |
| | | | | 123/568.12 |
| 6,330,870 | B1 * | 12/2001 | Inoue | F02D 13/0215 |
| | | | | 123/90.12 |
| 7,047,957 | B1 * | 5/2006 | Smith | F01L 1/053 |
| | | | | 123/508 |
| 8,036,855 | B2 * | 10/2011 | Kuzuyama | F02D 13/0215 |
| | | | | 123/308 |

\* cited by examiner

ABNORMALITY DIAGNOSIS DEVICE AND AN ABNORMALITY DIAGNOSIS METHOD FOR A VARIABLE VALVE MECHANISM

FIELD OF THE INVENTION

The present invention relates to an abnormality diagnosis device and an abnormality diagnosis method for a variable valve mechanism that is configured so as to open an exhaust valve even during an intake stroke in a predetermined operating state.

BACKGROUND ART

In an engine, such as an automobile engine, it is well-known to have a variable valve mechanism that varies an opening-closing timing of an intake valve and an exhaust valve, and controls a variable valve mechanism so as to make an overlap amount in the open states of an intake valve and of an exhaust valve large when the engine speed is high, and make it small when the engine speed is low in order to improve the engine performance.

When the variable valve mechanism is broken, it may cause a decrease of the fuel efficiency and the deterioration of the exhaust emission as well as the decrease of the engine performance, so that the engine having such a variable valve mechanism needs to diagnose the abnormality of the variable valve mechanism.

Correspondingly, as for the abnormality diagnosis of the variable valve mechanism, for example, the Patent Document 1 disclosed that an abnormality diagnosis of the variable valve mechanism, which changes the overlap amount in the open state of the intake valve and the open state of the exhaust valve by switching the opening-closing time of the intake valve, is performed based on the difference between the actually measured intake air amount and the predicted intake air amount based on a throttle valve opening degree and a rotational speed.

RELATED ART

Patent Document

Patent Document 1
Japanese Unexamined Patent Application Publication No. JP 06-317114

SUMMARY OF THE INVENTION

Problems to be Solved by the Invention

In recent years, a diesel engine having a variable valve mechanism is well-known that is capable of selecting a first mode that opens the exhaust valve only in the exhaust stroke or a second mode that opens the exhaust valve in the exhaust stroke and also in the intake stroke in the predetermined operating state.

In an engine having such a variable valve mechanism, for example, the temperature inside a combustion chamber is increased in cold start by controlling the variable valve mechanism to the second mode to open the exhaust valve during the intake stroke and recirculating a part of the exhaust gas from an exhaust passage into a cylinder in the intake stroke, so that the startability of the engine and the combustion stability are improved.

In such an engine having the variable valve mechanism configured to open the exhaust valve even in the intake stroke, when the variable valve mechanism is broken, degradation of the engine performance and the fuel efficiency and the deterioration of the exhaust emission may be caused; therefore, it is desirable to diagnose the abnormality of the variable valve mechanism with sufficient accuracy.

Accordingly, the present invention aims to perform accurately the abnormality diagnosis of the variable valve mechanism that is configured to open the exhaust valve even during the intake stroke.

BRIEF SUMMARY OF THE INVENTION

To solve the above mentioned problems, the present invention is configured as follows.

According to a first aspect of the invention, an abnormality diagnosis device of a variable valve mechanism is provided. The variable valve mechanism is configured to be capable of selecting a first mode, which opens an exhaust valve only during an exhaust stroke or a second mode, which opens the exhaust valve during the exhaust stroke and also during an intake stroke. The abnormality diagnosis device comprises an intake air amount detection device for detecting an intake air amount flowing in an intake passage, an exhaust gas pressure detection device for detecting a pressure of an exhaust gas, an exhaust gas returning amount calculation device for calculating an exhaust gas returning amount that is recirculating into a cylinder from an exhaust passage in the second mode based on an intake air amount in the first mode detected by the intake air amount detection device and an intake air amount in the second mode when a predetermined diagnosis condition is satisfied, an exhaust gas returning amount estimation device for estimating an exhaust gas returning amount that is recirculating into the cylinder from the exhaust passage in the second mode based on the exhaust gas pressure detected by the exhaust gas pressure detection device when the predetermined diagnosis condition is satisfied, and an abnormality determination device for determining that the variable valve mechanism is abnormal when a difference between an exhaust gas returning amount calculated by the exhaust gas returning amount calculation device and an exhaust gas returning amount estimated by the exhaust gas returning amount estimation device is bigger than a diagnosis threshold value. The exhaust gas returning amount estimation device estimates that the higher the exhaust gas pressure detected by the exhaust gas pressure detection device is, the larger the exhaust gas returning amount is.

According to the first aspect, the abnormality diagnosis device of the variable valve mechanism may further include an intake air pressure detection device for detecting an intake air pressure, and the exhaust gas returning amount estimation device may estimate that the smaller the intake air pressure detected by the intake air pressure detection device is, the larger the exhaust gas returning amount is.

Further according to the first aspect, the abnormality diagnosis device of the variable valve mechanism may include an exhaust gas temperature detection device for detecting an exhaust gas temperature, and the exhaust gas returning amount estimation device may estimate that the lower an exhaust gas temperature detected by the exhaust gas temperature detection device is, the larger the exhaust gas returning amount is.

Further according to the first aspect, the abnormality diagnosis device of the variable valve mechanism may include a fuel cutting device for stopping a fuel supply to an engine, and the abnormality determination device may perform an abnormality determination of the variable valve mechanism when stopping the fuel supply to the engine by the fuel cutting device.

Further according to the first aspect, the abnormality diagnosis device of the variable valve mechanism may include an EGR device for recirculating a part of the exhaust gas from the exhaust passage to the intake passage, and the abnormality determination device may perform an abnormality determination of the variable valve mechanism when stopping the exhaust gas recirculation from the exhaust passage to the intake passage by the EGR device.

Further according to the first aspect, the abnormality diagnosis device of the variable valve mechanism may include an engine speed detection device for detecting an engine speed, and an exhaust gas returning amount correction device for correcting the exhaust gas returning amount, which is calculated by the exhaust gas returning amount calculation device, by correcting the intake air amount in the first mode detected by the intake air amount detection device to the intake air amount detected in the second mode, based on a difference between an engine speed when detecting the intake air amount in the first mode by the engine speed detection device and an engine speed when detecting the intake air amount in the second mode. The abnormality determination device may determine that the variable valve mechanism is abnormal when a difference between an exhaust gas returning amount corrected by the exhaust gas returning amount correction device and an exhaust gas returning amount estimated by the exhaust gas returning amount estimation device is larger than a diagnosis threshold value.

According to a second aspect of the invention, an abnormality diagnosis method is provided for a variable valve mechanism that is configured to be capable of selecting a first mode that opens an exhaust valve only in an exhaust stroke or a second mode that opens the exhaust valve in the exhaust stroke and even during an intake stroke. The method comprises detecting an intake air amount in the first mode, in a first intake air amount detection step; detecting an intake air amount in the second mode, in a second intake air amount detection step; detecting a pressure of an exhaust gas when a predetermined diagnosis condition is satisfied, in an exhaust gas pressure detection step; estimating a variation amount of an intake air amount between the first mode and the second mode based on the exhaust gas pressure detected when the predetermined diagnosis condition is satisfied, in an intake air variation amount estimation step; estimating the intake air amount in the second mode based on a variation amount of the intake air amount in the first mode detected in the first intake air amount detection step and an intake air amount estimated in the intake air variation amount estimation step, in an intake air amount estimation step; and determining that the variable valve mechanism is abnormal when a difference between an intake air amount in the second mode detected in the second intake air amount detection step and an intake air amount in the second mode estimated in the intake air amount estimation step is larger than a diagnosis threshold value, in an abnormality determination step. Estimating in the intake air variation amount estimation step includes estimating that the higher an exhaust gas pressure detected by the exhaust gas pressure detection step is, the larger a variation amount of the intake air amount is.

According to a third aspect of the invention, an abnormality diagnosis device of a variable valve mechanism that is configured to be capable of selecting a first mode that opens an exhaust valve only in an exhaust stroke or a second mode that opens the exhaust valve during the exhaust stroke and also in an intake stroke, is provided. The abnormality diagnosis device includes an intake air amount detection device for detecting an intake air amount flowing in the intake passage, an exhaust gas pressure detection device for detecting a pressure of an exhaust gas, an intake air variation amount estimation device for estimating a variation amount of the intake air amounts between the first mode and the second mode based on an exhaust gas pressure detected by the exhaust gas pressure detection device when a predetermined diagnosis condition is satisfied, an intake air amount estimation device for estimating the intake air amount in the second mode based on a variation amount between an intake air amount in the first mode detected by the intake air amount detection device and an intake air amount estimated by the intake air variation amount estimation device; and an abnormality determination device for determining that the variable valve mechanism is abnormal when a difference between the intake air amount in the second mode detected by an intake air amount detection device and a intake air amount in the second mode estimated by an intake air amount estimation device is larger than a diagnosis threshold value. The intake air variation amount estimation device estimates that the higher an exhaust gas pressure detected by the exhaust gas pressure detection device is, the larger a variation amount of the intake air amount is.

Effects of the Invention

According to the present invention of each claim, the following effects are acquired by the above mentioned configuration.

First of all, according to the present invention described in the claim 1, the abnormality diagnosis of the variable valve mechanism configured to be capable of selecting the first mode that opens the exhaust valve only in the exhaust stroke, or the second mode that opens the exhaust valve in the exhaust stroke and also in the intake stroke, is performed by determining that the variable valve mechanism is abnormal when the difference between the exhaust gas returning amount recirculating into the cylinder from the exhaust passage in the second mode that is calculated based on the intake air amount in the first and the second modes, and the exhaust gas returning amount recirculating into the cylinder from the exhaust passage in the second mode that is estimated based on the pressure of the exhaust gas, is larger than the diagnosis threshold value.

According to this, by comparing the exhaust gas returning amount in the second mode calculated based on the intake air amount in the first and second modes with the exhaust gas returning amount in the second mode estimated based on the exhaust gas pressure, the abnormality diagnosis of the variable valve mechanism that is configured to open the exhaust valve even during the intake stroke can be performed accurately by taking into consideration the exhaust gas returning amount when the exhaust valve is opened during the intake stroke.

Moreover, since the higher the exhaust gas pressure is, the larger the exhaust gas returning amount is estimated to be, when the exhaust gas pressure is high, the difference between the intake air pressure and the exhaust gas pressure becomes high compared to when the exhaust gas pressure is low, so that the exhaust gas returning amount becomes large when the exhaust valve is opened during the intake stroke. By reflecting this, the exhaust gas returning amount can be estimated accurately and this effect is produced in an effective manner.

In addition, according to the present invention described in the claim 2, since the lower the intake air pressure is, the larger the exhaust gas returning amount is estimated to be, when the intake air pressure is low, the difference between the exhaust gas pressure and the intake air pressure becomes large compared to when the intake air pressure is high, so that the exhaust gas returning amount becomes large when the exhaust valve is opened during the intake stroke. By reflecting this, the exhaust gas returning amount can be estimated accurately and the effect is produced effectively.

Moreover, according to the present invention described in the claim 3, since the lower the exhaust gas temperature is, the larger the exhaust gas returning amount is estimated to be, when the exhaust gas temperature is low, the exhaust gas density becomes high compared to when the exhaust gas temperature is high, so that the exhaust gas returning amount becomes large when the exhaust valve is opened during the intake stroke. By reflecting this, the exhaust gas returning amount can be estimated accurately and the effect is produced effectively.

Furthermore, according to the present invention described in the claim 4, by performing the abnormality determination of the variable valve mechanism when the fuel supply to the engine is stopped, the abnormality diagnosis of the variable valve mechanism can be performed accurately since the environment inside the cylinder is in a stable condition when the fuel supply to the engine is stopped.

Moreover, according to the present invention described in the claim 5, by performing the abnormality determination of the variable valve mechanism when the recirculation of the exhaust gas from the exhaust passage to the intake passage is stopped, the abnormality diagnosis of the variable valve mechanism can be performed accurately since the flows inside of the intake passage and the exhaust passage are in stable conditions when the recirculation of the exhaust gas from the exhaust passage to the intake passage is stopped.

Additionally, according to the present invention described in the claim 6, by correcting the intake air amount in the first mode based on the difference between the engine speed when detecting the intake air amount in the first mode and the engine speed when detecting the intake air amount in the second mode, and correcting the exhaust gas returning amount in the second mode when the engine speed when detecting the intake air amount in the first mode and the engine speed when detecting the intake air amount in the second mode are different, the exhaust gas returning amount can be calculated accurately and the abnormality diagnosis of the variable valve mechanism can be performed more accurately.

Moreover, according to the present invention described in the claims 7 and 8, the abnormality diagnosis of the variable valve mechanism configured to be capable of selecting the first mode that opens the exhaust valve only in the exhaust stroke, or the second mode that opens the exhaust valve during the exhaust stroke and also during the intake stroke, is performed by determining that the variable valve mechanism is abnormal when the difference between the detected intake air amount in the second mode and the estimated intake air amount in the second mode is larger than the diagnosis threshold value, wherein the estimated intake air amount is based on estimating the variation amount between the intake air amounts in the first and second modes based on the exhaust gas pressure, and estimating the intake air amount in the second mode based on the variation amount between the detected intake air amount in the first mode and the estimated variation in the intake air amount.

According to this, by using the intake air amounts in the first mode and in the second mode, and the variation amount of the intake air amount between the intake amounts in the first and second modes corresponding to the exhaust gas returning amount in the second mode that is estimated based on the exhaust gas pressure, the abnormality diagnosis of the variable valve mechanism that is configured to open the exhaust valve even during the intake stroke can be performed accurately, taking into account the exhaust gas returning amount when the exhaust valve is opened during the intake stroke.

Moreover, since the higher the exhaust gas pressure is, the larger the variation amount of the intake air amount is estimated to be, when the exhaust gas pressure is high, the difference between the intake air pressure and the exhaust gas pressure becomes high compared to when the exhaust gas pressure is low, so that the exhaust gas returning amount becomes large when the exhaust valve is opened during the intake stroke. By reflecting this, the variation amount of the intake air amount can be estimated accurately and the effect is produced effectively.

DETAILED DESCRIPTION OF THE EMBODIMENTS

Figure 1:
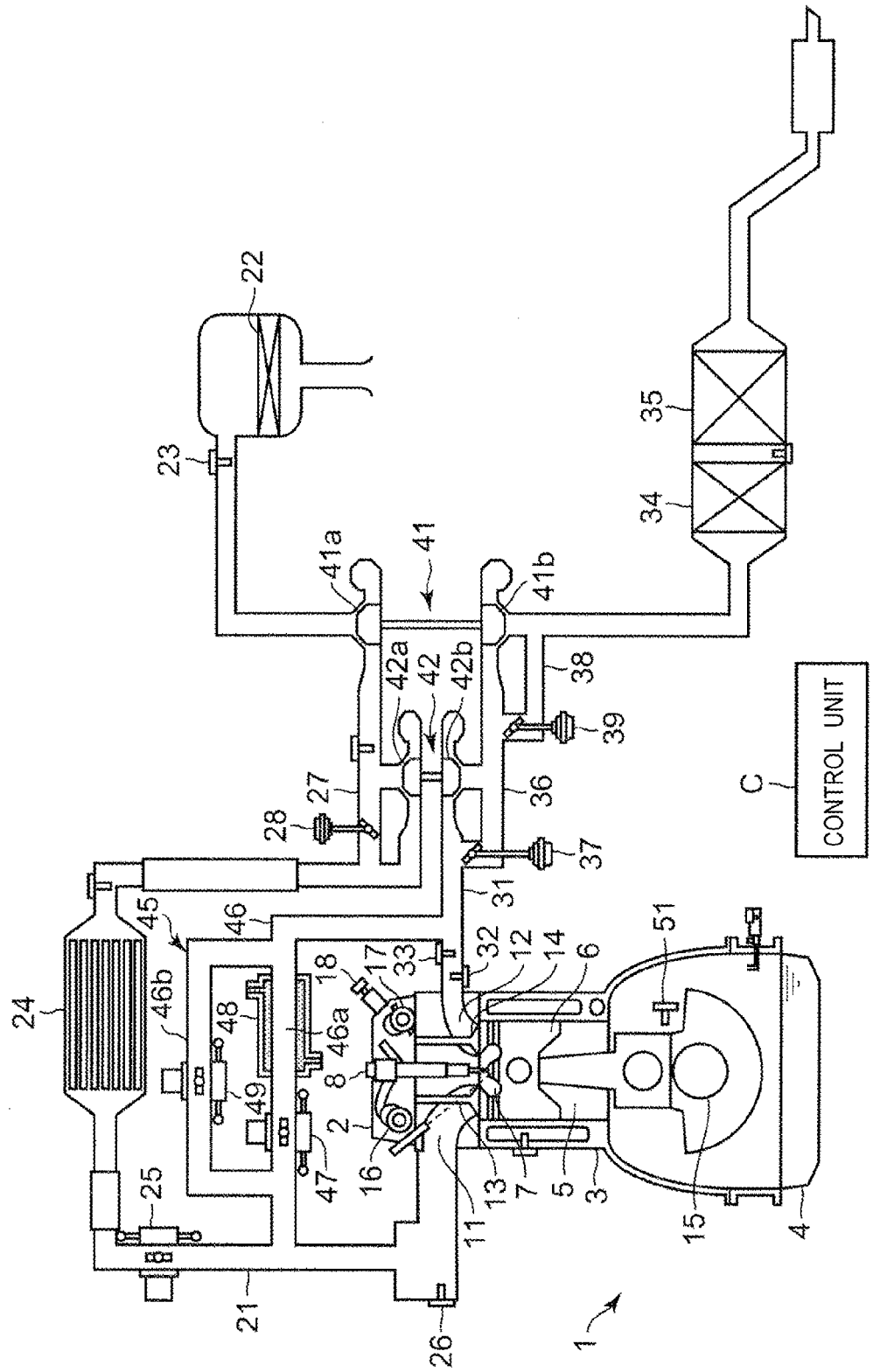
FIG. 1 shows an illustration of the system configuration of an engine that has a variable valve mechanism according to an embodiment of the present invention.
Figure 2:
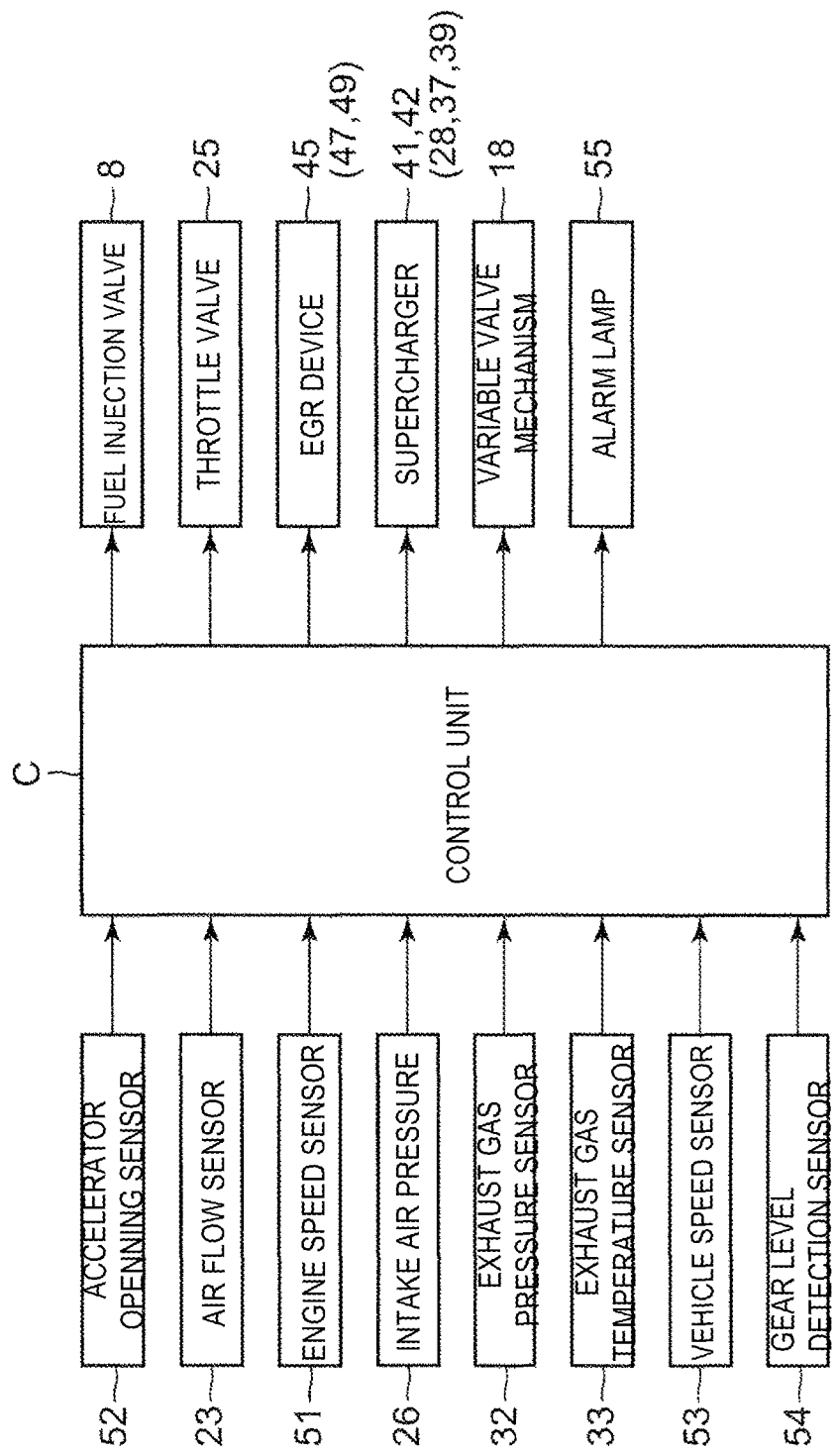
FIG. 2 shows a diagram of a control system of the engine.

Hereinafter, the embodiment of the present invention is described with reference to the accompanying drawings. FIG. 1 is a diagram of a system configuration of an engine that has a variable valve mechanism according to an embodiment of the present invention, and FIG. 2 is a diagram of the control system of the engine. An engine 1 shown in FIG. 1 is a multi-cylindered diesel engine with a plurality of cylinders arranged in a row. Although not limited to this, in the present embodiment, it is an in-line four cylinder diesel engine that has four cylinders arranged in a row.

The engine body of the engine 1 is formed by a cylinder head 2, a cylinder block 3, and an oil pan 4. A piston 6 is vertically movably passed through a cylinder 5 which is arranged to the cylinder block 3, and a combustion chamber 7 is formed between the top surface of the piston 6 and the lower surface of the cylinder head 2.

The cylinder head 2 has a fuel injection valve 8 that injects the fuel directly into the combustion chamber 7, and one or a plurality of intake ports 11 and one or a plurality of exhaust ports 12 are provided so as to surround a nozzle hole of the fuel injection valve 8. An intake valve 13 and an exhaust valve 14 are provided on the intake port 11 and the exhaust port 12 respectively.

The intake valve 13 is opened and closed in synchrony with the rotation of a crankshaft 15 at the predetermined timing by an intake air camshaft 16 that is drivably connected to the crankshaft 15, and the exhaust valve 14 is opened and closed in synchrony with the rotation of the crankshaft 15 at the predetermined timing by an exhaust camshaft 17 that is drivably connected to the crankshaft 15.

A variable valve mechanism 18 of the hydraulic operation type that switches the operations of the exhaust valve 14 selectively between the first mode that opens the exhaust valve 14 only in the exhaust stroke, and the second mode that opens the exhaust valve 14 in the exhaust stroke and also in the intake stroke, is provided on the exhaust valve 14 which is configured to open even during the intake stroke in the predetermined operating state.

Figure 3A:
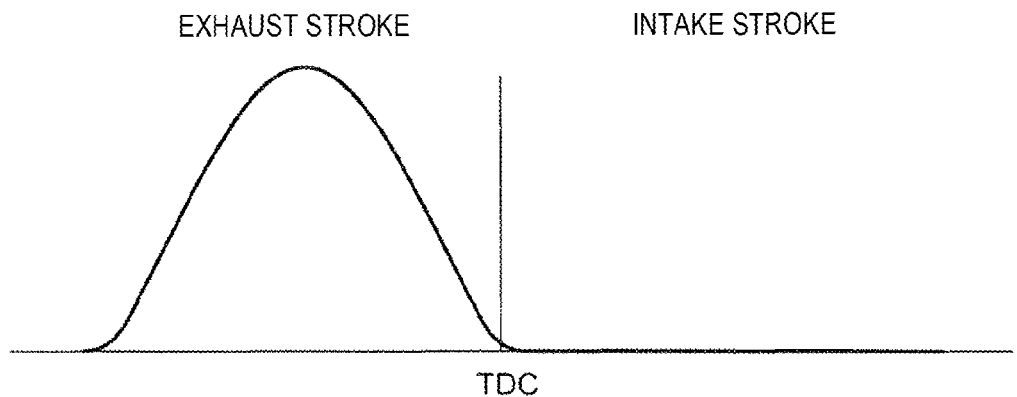
FIGS. 3(*a*) and 3(*b*) show diagrams illustrating the opening and closing times of an exhaust valve.
Figure 3B:
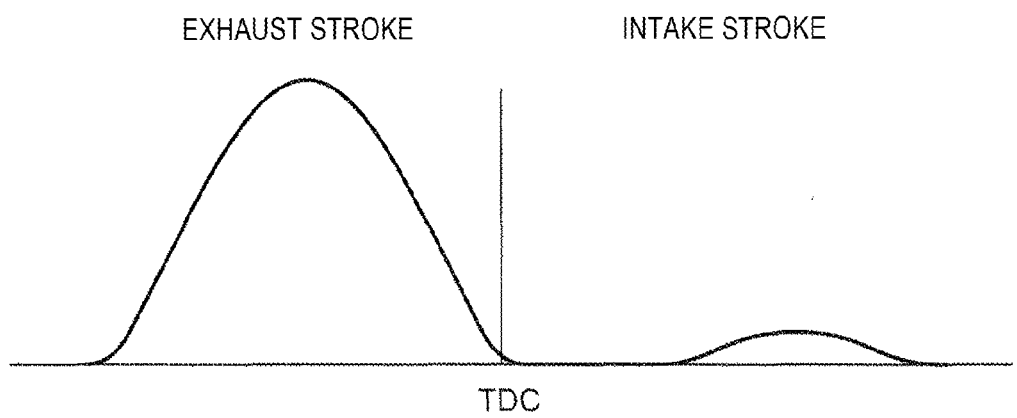

FIGS. 3(a) and 3(b) are diagrams showing the opening and closing times of an exhaust valve. FIG. 3(a) shows the opening and closing times of the exhaust valve in the first mode, and FIG. 3(b) shows the opening and closing times of the exhaust valve in the second mode. FIG. 3(a) and FIG. 3(b) show the crank angle on the horizontal axis and the valve lift amount on the vertical axis.

The exhaust valve 14 is controlled by the variable valve mechanism 18 to be opened only in the exhaust stroke in the first mode as shown in FIG. 3(a), and it is controlled to be opened in the exhaust stroke and also in the intake stroke again in the second mode as shown in FIG. 3(b).

An intake passage 21 is connected to the intake port 11 that is opened and closed by the intake valve 13, and an exhaust passage 31 is connected to the exhaust port 12 that is opened and closed by the exhaust valve 14. The intake passage 21 provides an air cleaner 22 that filters the intake air, an air flow sensor 23 as an intake air amount detection device that detects the intake air amount, a compressor 41a of a large-sized turbosupercharger 41 that supercharges the intake air to the combustion chamber 7, a compressor 42a of a small-sized turbosupercharger 42 that supercharges the intake air to the combustion chamber 7, an intercooler 24 that cools the air compressed by the compressors 41a and 42a, a throttle valve 25 that adjusts the intake air amount of each cylinder 5 to the combustion chamber 7, and an intake air pressure sensor 26 as an intake air pressure detection device that detects the intake air pressure, from the upstream toward the downstream.

The throttle valve 25 is controlled based on the accelerator opening degree, and is in the fully opened state at the time of normal operation and is in the fully closed state at the time of idling operation. Moreover, a bypass passage where the intake air flows, bypassing the throttle valve 25 even in the fully closed state, is provided in the vicinity of the throttle valve 25. The bypass passage is not shown in figures.

A small-sized intake air bypass passage 27 that bypasses the compressor 42a of the small-sized turbosupercharger 42 is connected to the intake passage 21. A small-sized intake air bypass valve 28 for adjusting the air amount that flows to the small-sized intake air bypass passage 27 is provided on the small-sized intake air bypass passage 27.

Meanwhile, the exhaust passage 31 provides an exhaust gas pressure sensor 32 as an exhaust gas pressure detection device for detecting the pressure of the exhaust gas, an exhaust gas temperature sensor 33 as an exhaust gas temperature detection device for detecting the temperature of the exhaust gas, a turbine 42b of the small-sized turbosupercharger 42, a turbine 41b of the large-sized turbosupercharger 41, an oxidation catalyst 34 for purifying the exhaust gas by oxidizing HC and CO included in the exhaust gas, and a particulate filter 35 for collecting the exhaust particulate included in the exhaust gas, from the upstream toward the downstream.

A small-sized exhaust bypass passage 36 for bypassing the turbine 42b of the small-sized turbosupercharger 42 is also connected to the exhaust passage 31, and a small-sized exhaust bypass valve 37 for adjusting the flow rate of the exhaust gas flowing to the small-sized exhaust bypass passage 36 is provided on the small-sized exhaust bypass passage 36.

A large-sized exhaust bypass passage 38 for bypassing the turbine 41b of the large-sized turbosupercharger 41 is also connected to the exhaust passage 31, and a large-sized exhaust bypass valve 39 for adjusting the flow rate of the exhaust gas flowing to the large-sized exhaust bypass passage 38 is provided on the large-sized exhaust bypass passage 38.

An EGR device 45 as an EGR device for recirculating a part of the exhaust gas from the exhaust passage 31 to the intake passage 21 is provided on the engine 1 in order to reduce the NOx included in the exhaust gas. The EGR device 45 includes a recirculation passage 46 that diverges from the exhaust passage 31 further upstream than the turbine 42b of the small-sized turbosupercharger 42 in the flow direction of the exhaust gas and connects to the intake passage 21 further downstream than the throttle valve 25.

The recirculation passage 46 is configured with an exhaust gas recirculation valve 47 for adjusting the recirculation amount of the exhaust gas to be recirculated from the exhaust passage 31 to the intake passage 21, a main passage 46a on which an EGR cooler 48 is provided for cooling the exhaust gas, and a cooler bypass passage 46b for bypassing the EGR cooler 48. A cooler bypass valve 49 for adjusting the flow rate of the exhaust gas flowing to the cooler bypass passage 46b is provided on the cooler bypass passage 46b.

Moreover, the configurations related to the configuration of the engine 1, such as an engine speed sensor 51 as an engine speed detection device for detecting the engine speed, an accelerator opening degree sensor 52 for detecting the stepping amount of the accelerator pedal (accelerator opening degree), a vehicle speed sensor 53 as a vehicle speed detection device for detecting the vehicle speed, and a transmission detection sensor 54 as a gear level detection device for detecting the gear level of the transmission, are provided.

In addition, a control unit C is provided for controlling the engine 1 and its related configurations. The control unit C is a comprehensive control device of the engine 1 and, as shown in FIG. 2, performs various controls parts such as the fuel injection valve 8, the throttle valve 25, the EGR device 45 that is specifically the exhaust gas recirculation valve 47 and the cooler bypass valve 49, superchargers 41 and 42 that are the specifically small-sized intake air bypass valve 28, the small-sized exhaust bypass valve 37, and the large sized exhaust bypass valve 39, the variable valve mechanism 18, and an alarm lamp 55 described below, based on control information from various parts such as an accelerator opening degree sensor 52, an air flow sensor 23, an engine speed sensor 51, an intake air pressure sensor 26, an exhaust gas pressure sensor 32, an exhaust gas temperature sensor 33, a vehicle speed sensor 53, and a gear level detection sensor 54. Moreover, the control unit C is configured with a microcomputer as a principal part.

An alarm lamp 55 is deployed in the vicinity of the driver's seat, and functions as an alarm device to inform the passengers about the abnormality of the variable valve mechanism 18 by lighting when it is determined that the variable valve mechanism 18 is abnormal in the below mentioned abnormality diagnosis processing of the variable valve mechanism 18.

According to the present embodiment, the control unit C controls operations of the fuel injection valve 8 to perform fuel cutting for stopping the fuel to the engine 1 when the vehicle speed that is detected by the vehicle speed sensor 53 is over the predetermined vehicle speed, for example, over 70 km per hour, and the accelerator opening degree that is detected by the accelerator opening degree sensor 52 is in the fully closed state.

Although the control unit C controls the operation of the EGR device 45, specifically the exhaust gas recirculation valve 47 and the cooler bypass valve 49, so as to recirculate a part of the exhaust gas from the exhaust passage 31 to the intake passage 21, the control unit C also controls the operation of the EGR device 45 so as to stop the recirculation of the exhaust gas from the exhaust passage 31 to the intake passage 21 when the vehicle speed detected by the vehicle speed sensor 53 is more than the predetermined vehicle speed, for example it is not less than 70 km, and the accelerator opening degree detected by the accelerator opening degree sensor 52 is in the fully closed state.

In the engine 1, in cold start, the temperature inside the combustion chamber 7 is increased by controlling the operation of the exhaust valve 14 to the second mode so as to open the exhaust valve 14 during the intake stroke and recirculating a part of the exhaust gas from the exhaust passage 31 into the cylinder 5 in the intake stroke.

In the engine 1 configured in this way, the abnormality diagnosis of the variable valve mechanism 18 that is configured to be capable of selecting the first mode, which opens the exhaust valve 14 only in the exhaust stroke and the second mode, which opens the exhaust valve 14 in the exhaust stroke and also in the intake stroke, can be performed.

Next, the abnormality diagnosis processing of the variable valve mechanism according to the embodiment of the present invention is described. According to the present embodiment, when the accelerator opening degree is in the fully closed state in the case that the gear level of the transmission is the highest speed gear level and also the vehicle speed is more than the predetermined vehicle speed, the control unit C performs the abnormality diagnosis of the variable valve mechanism 18 by controlling the operation of the variable valve mechanism 18 so as to switch the operation of the exhaust valve 14 between the first mode and the second mode, calculating the returning amount of the exhaust gas recirculating from the exhaust passage 31 into the cylinder in the second mode based on the intake air amounts in the first mode and the second mode, estimating the returning amount of the exhaust gas recirculating from the exhaust passage 31 into the cylinder in the second mode based on the exhaust gas pressure, and comparing the calculated returning amount of the exhaust gas with the estimated returning amount of the exhaust gas.

Figure 4:
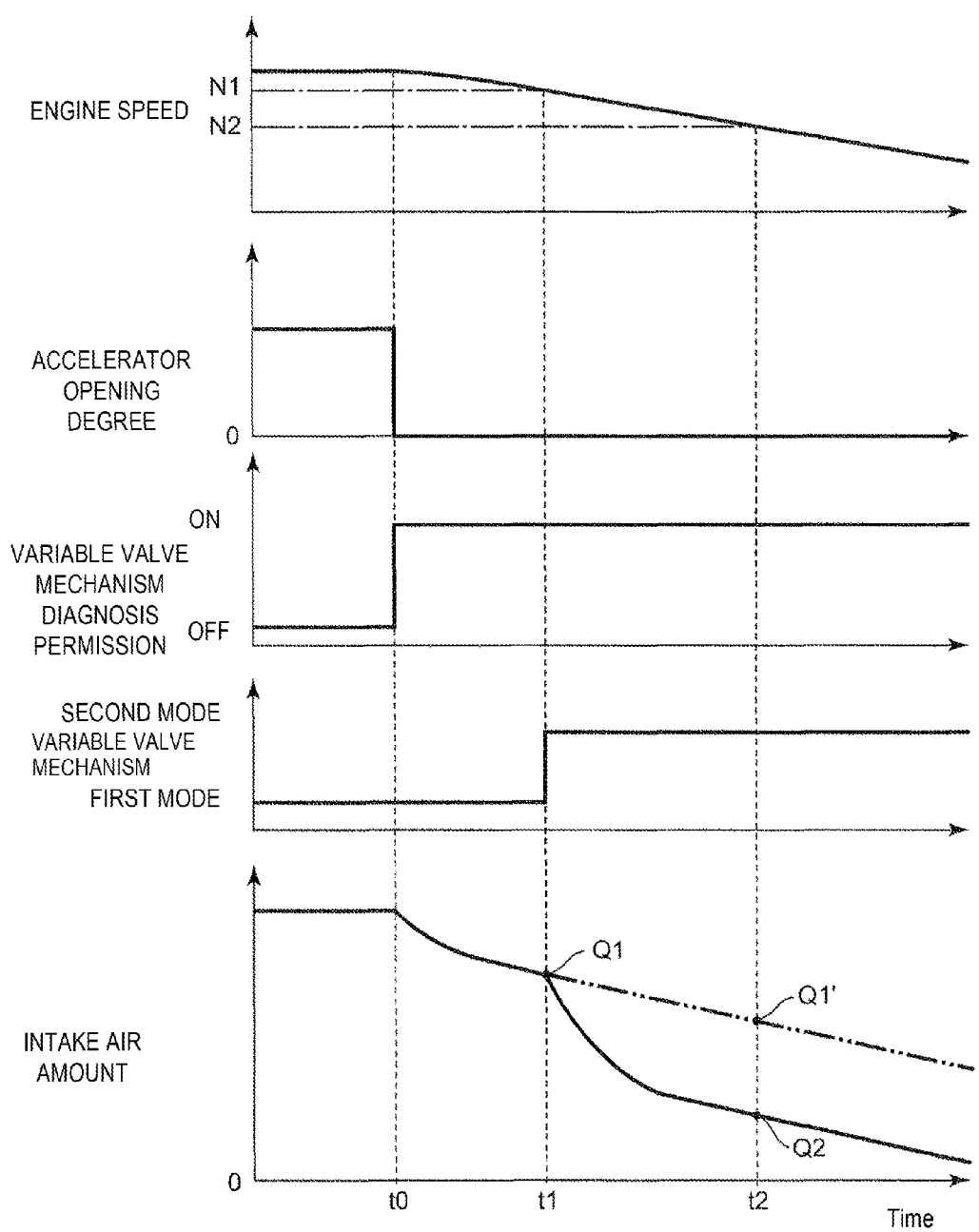
FIG. 4 shows a diagram illustrating the changes of an engine speed, an accelerator opening degree, a diagnosis permission of a variable valve mechanism, the variable valve mechanism, and an intake air amount at the time of the abnormality diagnosis processing of the variable valve mechanism.

FIG. 4 shows a diagram illustrating the changes of the engine speed, the accelerator opening degree, the diagnosis permission of the variable valve mechanism, the variable valve mechanism, and the intake air amount at the time of the abnormality diagnosis processing of the variable valve mechanism. In the case that the gear level is the highest speed gear level and the vehicle speed is more than the predetermined vehicle speed, for example, it is not less than 70 km, and the operation of the exhaust valve 14 is set in the first mode, as shown in FIG. 4, when the accelerator opening degree is in the fully closed state, the abnormality diagnosis processing of the variable valve mechanism 18 is executed by switching the diagnosis permission signal of the variable valve mechanism 18 from the OFF state to the ON state in the control unit C. That is, the abnormality diagnosis processing according to the present embodiment is performed when the engine is in a stable condition by stopping the recirculation of the EGR gas by the EGR device 45 together with cutting the fuel supply, and when the change of the engine speed is in a stable condition by correcting the engine speed corresponding to the change in the engine speed between the engine speed at the intake air amount detection time in the first mode and the engine speed at the intake air amount detection time in the second mode as mentioned below.

As shown in FIG. 4, when the accelerator opening degree is in the fully closed state, the engine speed and also the intake air amount will decrease. Then, an intake air amount Q1 and an engine speed N1 are detected at a timing 1, which is after a predetermined amount of time passes from a timing t0 when the diagnosis permission signal of the variable valve mechanism 18 is set to the ON state, and the intake air amount Q1 and the engine speed N1 at the timing t1 are read into the control unit C. Meanwhile, the control unit C controls the operation of the variable valve mechanism 18 to switch the operation of the exhaust valve 14 to the second mode.

After this, an intake air amount Q2 and an engine speed N2 as well as an exhaust gas pressure $P_0$, an intake air pressure $p_1$, and an exhaust gas temperature $T_0$, are detected after a predetermined amount of time passes, and then the intake air amount Q2, the engine speed N2, the exhaust gas pressure $P_0$, the intake air pressure $p_1$, and the exhaust gas temperature $T_0$ are read into the control unit C.

When the operation of the exhaust valve 14 is switched from the first mode to the second mode, the exhaust gas will recirculate from the exhaust passage 31 into the cylinder 5. That is, since the exhaust gas once discharged to the exhaust passage 31 flows back into the cylinder 5, the intake air amount Q2 in the second mode becomes small compared with the intake air amount Q1 in the first mode, and the control unit C calculates the difference of the intake air amount (Q1−Q2) between the first mode and the second mode as the returning amount of the exhaust gas recirculating from the exhaust passage 31 into the cylinder 5 in the second mode.

Specifically, as shown in dashed and double-dotted lines in FIG. 4, since the intake air amount Q2 in the first mode is reduced corresponding to the reduction of the engine speed, based on the difference between the engine speed N1 when detecting the intake air amount Q1 in the first mode and the engine speed N2 when detecting the intake air amount Q2 in the second mode, considering that the intake air amount will change in proportion to the engine speed, the intake air amount Q1 in the first mode is corrected to an intake air amount Q1' in the first mode when detecting the intake air amount Q2 in the second mode.

Additionally, the exhaust gas returning amount (Q1−Q2) in the second mode, which is calculated based on the intake air amount Q1 in the first mode and the intake air amount Q2 in the second mode, is corrected and calculated to the exhaust gas returning amount (Q1'-Q2) in the second mode by using the corrected intake air amount Q1' in the first mode.

On the other hand, in the control unit C, the exhaust gas returning amount recirculating from the exhaust passage 31 into the cylinder 5 in the second mode is estimated by using a formula shown in the following Formula 1 based on the exhaust gas pressure when detecting the intake air amount Q2 in the second mode, specifically based on the intake air pressure and the exhaust gas temperature in addition to the exhaust gas pressure.

$$M = C_d \frac{A_t P_0}{\sqrt{RT_0}} \left(\frac{p_1}{p_0}\right)^{\frac{1}{\gamma}} \sqrt{\frac{2\gamma}{\gamma-1}\left(1-\left(\frac{p_1}{p_0}\right)^{\frac{\gamma-1}{\gamma}}\right)}$$

[Formula 1]

In the formula shown in Formula 1, M is an estimate value of the exhaust gas returning amount when the operation of the exhaust valve 14 is performed in the second mode, $P_0$ is the exhaust gas pressure, $p_1$ is the intake air pressure, and $T_0$ is the exhaust gas temperature. Moreover, $C_d$ shows a flow coefficient, $A_t$ shows an open area of the exhaust port 12 and the exhaust valve 14 when opening the exhaust valve 14 in the intake stroke, γ shows a ratio of specific heat of the exhaust gas, and R shows a gas constant, respectively.

Figure 5:
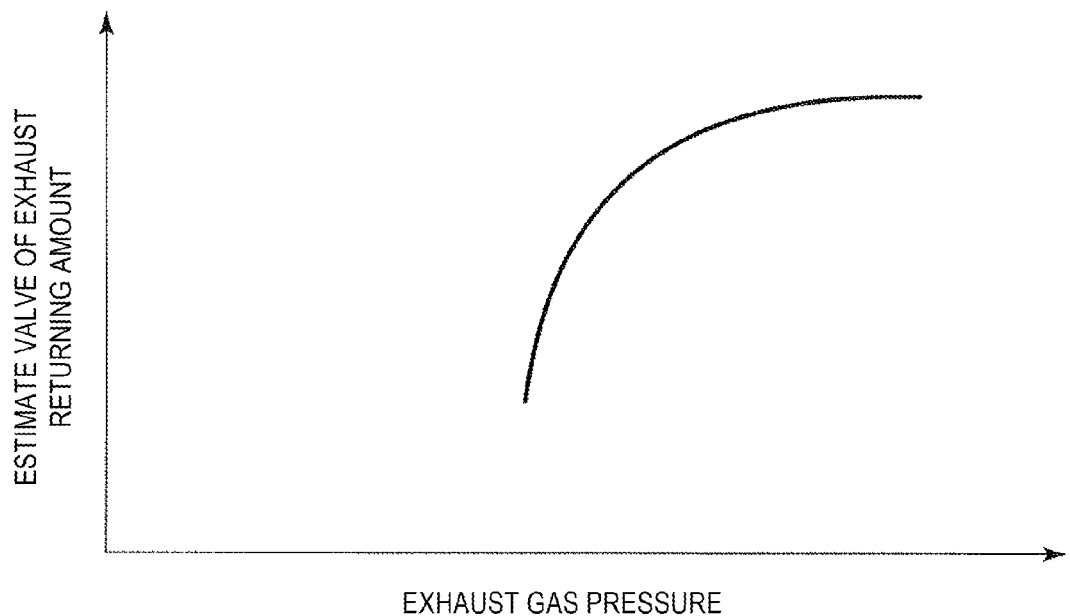
FIG. 5 shows a graph illustrating the relationship between the exhaust gas pressure and the estimated value of the exhaust gas returning amount.

In the formula shown in Formula 1, the larger the exhaust gas pressure is, the larger the estimate value M of the exhaust gas returning amount is calculated. FIG. 5 is a graph showing the relationship between the exhaust gas pressure and the estimate value of the exhaust gas returning amount with the exhaust gas pressure on the horizontal axis and with the estimate value of the exhaust gas returning amount on the vertical axis. As shown in FIG. 5, the larger the exhaust gas pressure is, the larger the estimate value of the exhaust gas returning amount is calculated to be.

Figure 6:
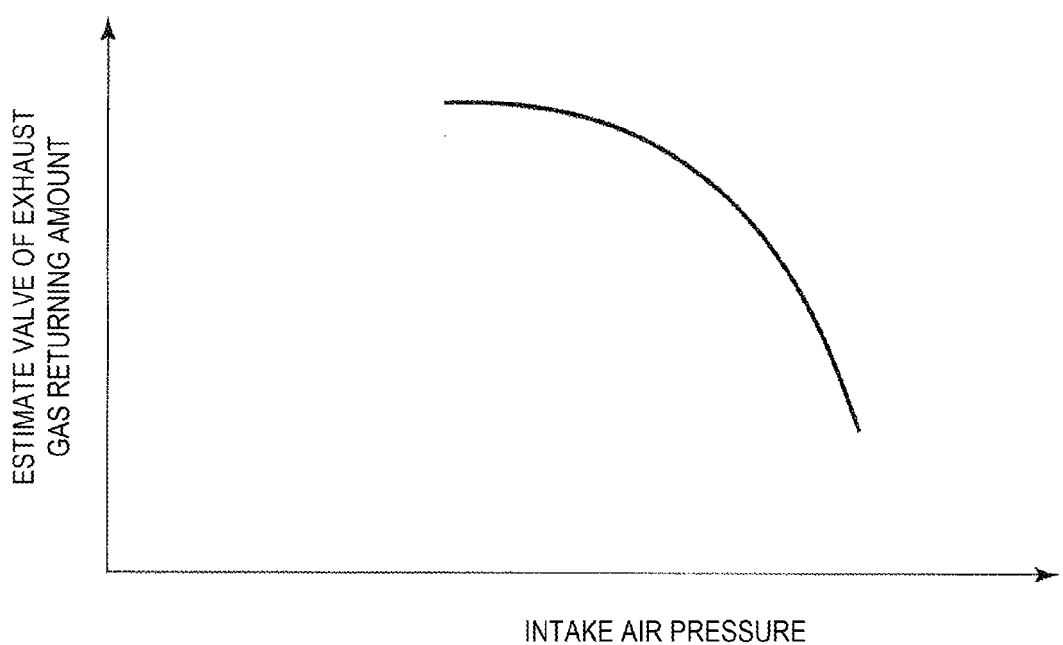
FIG. 6 shows a graph illustrating the relationship between the intake air pressure and the estimated value of the exhaust gas returning amount.

In the formula shown in Formula 1, the smaller the intake air pressure is, the larger the estimate value M of the exhaust gas returning amount is calculated to be. FIG. 6 is a graph showing the relationship between the intake air pressure and the estimate value of the exhaust gas returning amount with the intake air pressure on the horizontal axis and with the estimate value of the exhaust gas returning amount on the vertical axis. As shown in FIG. 6, the smaller the intake air pressure is, the larger the estimate value of the exhaust gas returning amount is calculated to be.

Figure 7:
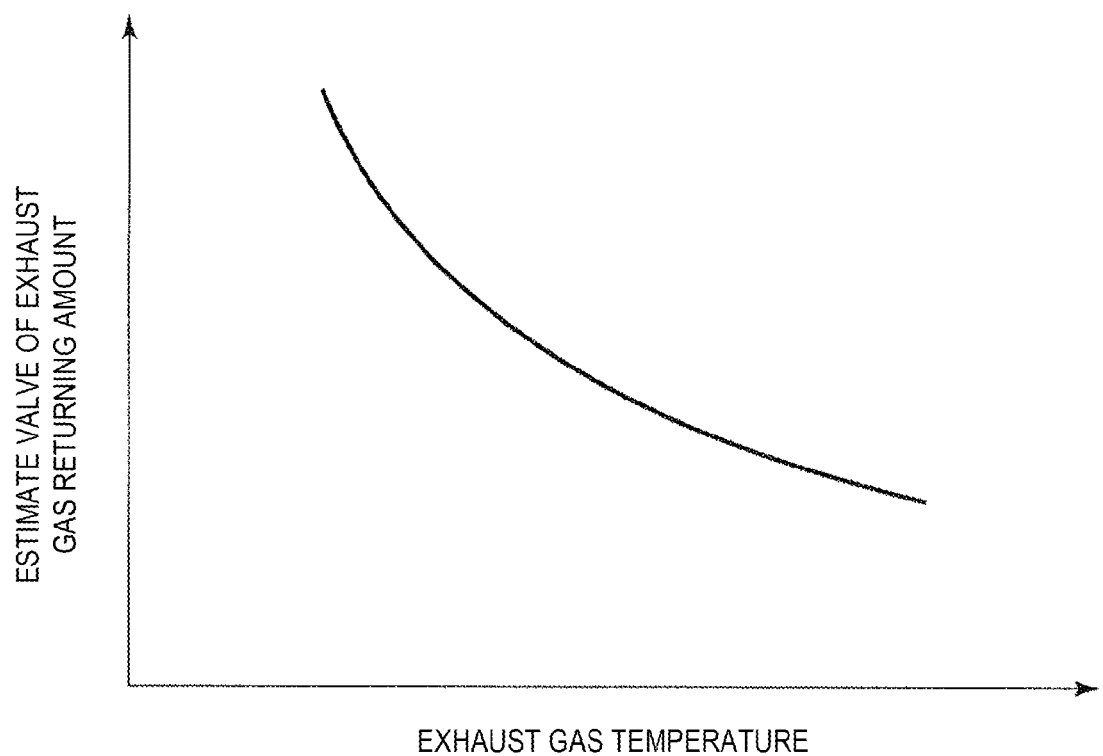
FIG. 7 shows a graph illustrating the relationship between the exhaust gas temperature and the estimated value of the exhaust gas returning amount.

In addition, in the formula shown in Formula 1, the smaller the exhaust gas temperature is, the larger the estimate value M of the exhaust gas returning amount is calculated to be. FIG. 7 is a graph showing the relationship between the exhaust gas temperature and the estimate value of the exhaust gas returning amount with the exhaust gas temperature on the horizontal axis and with the estimate value of the exhaust gas returning amount on the vertical axis. As shown in FIG. 7, the smaller the exhaust gas temperature is, the larger estimate value of the exhaust gas returning amount is calculated to be.

Moreover, the control unit C determines that variable valve mechanism 18 is abnormal when the difference |M−(Q1'−Q2)| between the calculated exhaust gas returning amount (Q1'−Q2) and the estimated exhaust gas returning amount M is larger than a diagnosis threshold value X1.

The diagnosis threshold value X1 sets up a range wherein the operation of the variable valve mechanism 18 is normal, and its value may be set according to the desired number of variable valve mechanisms 18 to detect for abnormalities among a plurality of provided variable valve mechanisms 18. For example, when detecting the abnormality of the variable valve mechanism 18 provided on at least one of the four cylinders 5, the value may be set at one-fourth of the value of the estimate value M of the exhaust gas returning amount, taking into account an estimation error, and when detecting the abnormality of the variable valve mechanisms 18 provided on at least two of the four cylinders 5, the value may be set by at half of the value of the estimate value M of the exhaust gas returning amount, taking into account an estimation error amount. In this way, by taking into account the demand of the emission performance, the diagnosis threshold value can be set up corresponding to the number of variable valve mechanisms to detect for failures.

When the variable valve mechanism 18 fails and the operation of the exhaust valve 14 does not switch from the first mode to the second mode, although the intake air amount Q1 at the timing t1 is detected, since the intake air amount Q2 detected at the timing t2 becomes large, the exhaust gas returning amount in the second mode is calculated to be small, and the difference between the calculated the exhaust gas returning amount and the estimated exhaust gas returning amount becomes large, so that the abnormality of the variable valve mechanism 18 can be detected.

When the operation of the exhaust valve 14 does not switch from the first mode to the second mode, in cold start, the exhaust valve 14 does not open in the intake stroke, the combustion stability is deteriorated since the temperature inside the combustion chamber 7 cannot be increased, and the exhaust emission is deteriorated by the delayed temperature rise of the catalyst; however, according to the present embodiment, controlling the degradation of combustion stability or the deterioration of the exhaust emission by detecting the abnormality of the variable valve mechanism 18 is possible.

On the other hand, when the variable valve mechanism 18 fails and the operation of the exhaust valve 14 does not switch from the second mode to the first mode, although the intake air amount Q2 at the timing t2 is detected, since the intake air amount Q1 detected at the timing t1 becomes small, the exhaust gas returning amount in the second mode is calculated to be small, and the difference between the calculated the exhaust gas returning amount and the estimated exhaust gas returning amount becomes large, so that the abnormality of the variable valve mechanism 18 can be detected.

When the operation of the exhaust valve 14 does not switch from the second mode to the first mode, even at times other than when cold starting, the exhaust valve 14 is opened in the intake stroke, and the oxygen concentration inside the combustion chamber 7 is reduced due to the decreasing the intake air amount, and accordingly the exhaust emission is deteriorated since the EGR device 45 cannot recirculate the exhaust gas from the exhaust passage 31 to the intake passage 21; however, according to the present embodiment, controlling the deterioration of the exhaust emission by detecting the abnormality of the variable valve mechanism 18 is possible.

Figure 8:
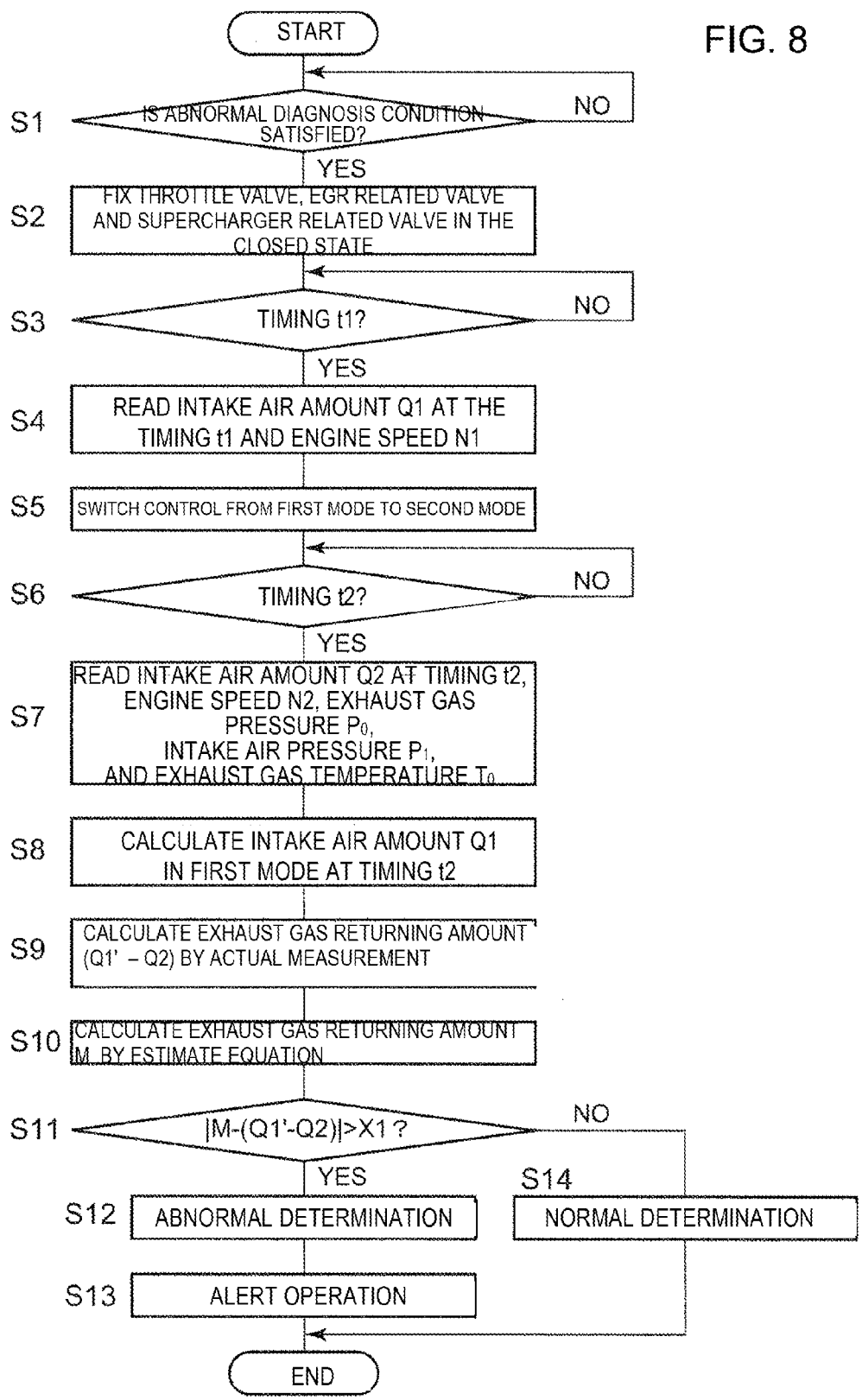
FIG. 8 shows a flowchart illustrating an abnormality diagnosis processing of the variable valve mechanism.

FIG. 8 shows a flowchart illustrating an abnormality diagnosis processing of the variable valve mechanism. As shown in FIG. 8, when performing the abnormality diagnosis processing of the variable valve mechanism, the control unit C, at first, determines whether the abnormality diagnosis conditions are satisfied or not (step S1).

An abnormality diagnosis condition exists when the gear level of the transmission is the highest gear level, and the vehicle speed is more than a predetermined vehicle speed, for example it is not less than 70 km per hour, and the accelerator opening degree is in the fully closed state. Therefore, according to the present embodiment, the abnormality diagnosis processing is performed when the engine is in stable condition when the recirculation of the EGR gas by the EGR device 45 is stopped and the fuel supply is cut, and it is performed when the change in the engine speed is in a stable condition in a fully closed deceleration from a high vehicle speed and high gear level.

When the determination result in a step S1 becomes YES, that is, the abnormality diagnosis conditions are satisfied, the abnormality diagnosis processing is executed by switching the diagnosis permission signal of the variable valve mechanism 18 from the OFF state to the ON state. The control unit C controls the throttle valve 25, the EGR device related valves 47 and 49, and the supercharger related valves 28, 37, and 39, so as to fix the throttle valve 25, the EGR device related valves, specifically the exhaust gas recirculation valve 47 and the cooler bypass valve 49, and the supercharger related valves, specifically the small-sized intake air bypass valve 28, the small-sized exhaust bypass valve 37, and the large-sized exhaust bypass valve 39, to their respective fully closed states (step S2). As mentioned above, according to the present embodiment, when the control unit C controls to stop the fuel supply to the engine 1 by the fuel injection valve 8, the abnormality diagnosis is executed.

Moreover, it is determined whether the timing t1, which is the predetermined time after the timing t0 when the diagnosis permission signal of the variable valve mechanism 18 is set to the ON state (Step S3), has been reached, and when the timing t1 has been reached, the intake air amount Q1 and the engine speed N1 at the timing t1 in the first mode are detected and then they are read into the control unit C (Step S4).

When the intake air amount Q1 and the engine speed N1 are read into the control unit C, the operation of the variable valve mechanism 18 is controlled to switch the operation of the exhaust valve 14 from the first mode to the second mode (Step S5). Moreover, it is determined whether the timing t2, which is the predetermined time after the timing t1 (Step S6), has been reached, and when the timing t2 has been reached, the intake air amount Q2, the engine speed N2, the exhaust gas pressure $P_0$, the intake air pressure $p_1$, and exhaust gas temperature $T_0$ at the timing t2 in the second mode are detected and then they are read into the control unit C (Step S7).

The calculation is done by correcting the intake air amount Q1 in the first mode that is read in the Step S4 to the intake air amount Q1' in the first mode when the intake air amount Q2 in the second mode was detected, based on the difference between the engine speed N1 that was read in the Step S4 and the engine speed N2 that was read in Step S7.

When the intake air amount Q1' in the first mode at the timing t2 is calculated, based on the intake air amount Q1' calculated in the Step S8 and the intake air amount Q2 read in the Step S7, the exhaust gas returning amount (Q1'-Q2) in the second mode is calculated by actual measurement (Step S9).

In addition, using an estimate equation shown in the Formula 1, based on the exhaust gas pressure $P_0$, the intake air pressure $p_1$, and the exhaust gas temperature $T_0$ that are read in the Step S7, the control unit C calculates the exhaust gas returning amount M by using the estimate equation when the operation of the exhaust valve 14 is performed in the second mode (Step S10).

Moreover, the control unit C determines whether the difference |M−(Q1'−Q2)| between the calculated exhaust gas returning amount (Q1'−Q2) by the actual measurement in the Step S9 and the calculated exhaust gas returning amount M by the estimate equation in the Step S10 is larger than the diagnosis threshold value X1 (Step S11).

When the determination result in the step S11 becomes YES, that is, when the difference |M−(Q1'−Q2)| between the exhaust gas returning amount (Q1'−Q2) based on the actual measurement and the exhaust gas returning amount M based on the estimate equation is larger than the diagnosis threshold value X1, the variable valve mechanism 18 is determined to be abnormal (Step S12), an alarm is operated, an alarm lamp 55 is turned on (Step S13), and the abnormality diagnosis is terminated.

On the other hand, when the determination result in the step S11 becomes NO, that is when the difference |M−(Q1'−Q2)| between the exhaust gas returning amount (Q1'−Q2) based on the actual measurement and the exhaust gas returning amount M based on the estimate equation is no more than the diagnosis threshold value X1, the variable valve mechanism 18 is determined to be normal (Step S14) and the abnormality diagnosis is terminated.

Moreover, in the abnormality diagnosis processing, although the variable valve mechanism 18 is determined to be abnormal when the difference |M−(Q1'−Q2)| between the exhaust gas returning amount (Q1'−Q2) and the exhaust gas returning amount M based on the estimate equation is larger than the diagnosis threshold value X1, it is possible to determine that the variable valve mechanism 18 is abnormal when the difference |M−(Q1−Q2)| between the exhaust gas returning amount (Q1−Q2) that is calculated based on the difference of the intake air amounts between the first mode and the second mode, and the exhaust gas returning amount M based on the estimate equation is larger than the diagnosis threshold value X1 when, for example, the change of the engine speed is small enough, or when it can be determined that the correction based on the engine speed can be omitted in the relationship between the emission performance and the diagnosis accuracy, In this way, according to the present embodiment, the abnormality diagnosis of the variable valve mechanism 18 configured to be capable of selecting the first mode that opens the exhaust valve 14 only in the exhaust stroke, or the second mode that opens the exhaust valve 14 during the exhaust stroke and also the intake stroke is performed by determining that the variable valve mechanism 18 is abnormal when the difference between the calculated exhaust gas returning amount circulating from the exhaust passage 31 into the cylinder 5 in the second mode based on the intake air amounts in the first and the second modes, and the estimated exhaust gas returning amount circulating from the exhaust passage 31 into the cylinder 5 in the second mode based on the exhaust gas pressure is larger than the diagnosis threshold value.

According to this, by comparing the exhaust gas returning amount in the second mode calculated based on the intake air amounts in the first and second modes with the exhaust gas returning amount in the second mode estimated based on the exhaust gas pressure, the abnormality diagnosis of the variable valve mechanism 18 taking into account the exhaust gas returning amount can be performed when the exhaust valve 14 is opened during the intake stroke, so that the abnormality diagnosis of the variable valve mechanism 18 that is configured to open the exhaust valve 14 during the intake stroke can be performed accurately.

Moreover, since the higher the exhaust gas pressure is, the larger the exhaust gas returning amount is estimated to be, when the exhaust gas pressure is high, the difference between the exhaust gas pressure and the intake air pressure is high compared to when the exhaust gas pressure is low, so that the exhaust gas returning amount becomes large when the exhaust valve 14 is opened during the intake stroke. By reflecting this, the exhaust gas returning amount can be estimated accurately.

Moreover, since the lower the intake air pressure is, the larger the exhaust gas returning amount is estimated to be, when the intake air pressure is low, the difference between the exhaust gas pressure and the intake air pressure is large compared with when the intake air pressure is high, so that the exhaust gas returning amount becomes large when the exhaust valve 14 is opened during the intake stroke. By reflecting this, the exhaust gas returning amount can be estimated accurately.

Further, since the lower the exhaust gas temperature is, the larger the exhaust gas returning amount is estimated to be, when the exhaust gas temperature is low, the exhaust gas density is high compared with when the exhaust gas temperature is high, so that the exhaust gas returning amount becomes large when the exhaust valve 14 is opened during the intake stroke. By reflecting this, the exhaust gas returning amount can be estimated accurately.

According to the present embodiment, by performing the abnormality determination of the variable valve mechanism 18 when the fuel supply to the engine 1 is stopped, the abnormality diagnosis of the variable valve mechanism 18 can be performed accurately because the environment inside the cylinder is in a stable condition when the fuel supply to the engine 1.

Moreover, by performing the abnormality determination of the variable valve mechanism 18 when the recirculation of the exhaust gas from the exhaust passage 31 to the intake passage 21 is stopped, the abnormality diagnosis of the variable valve mechanism 18 can be performed accurately because the flows inside of the intake passage 21 and the exhaust passage 31 are in a stable condition when the recirculation of the exhaust gas from the exhaust passage 31 to the intake passage 21 is stopped.

Additionally, the exhaust gas returning amount is corrected by correcting the intake air amount in the first mode, based on the difference between the engine speed N1 when detecting the intake air amount in the first mode and the engine speed N2 when detecting the intake air amount in the second mode, and by correcting the exhaust gas returning amount in the second mode, when the engine speed when the intake air amount is detected in the first mode and the engine speed when the intake air amount is detected in the second mode are different, the exhaust gas returning amount can be calculated accurately and the abnormality diagnosis of the variable valve mechanism 18 can be performed more accurately. Further, since the abnormality diagnosis is performed when the engine is in stable condition by stopping the recirculation of the EGR gas by the EGR device 45 and cutting the fuel supply, and the abnormality diagnosis processing is performed during a fully closed deceleration from the high vehicle speed and high gear level when the change of the engine speed is in stable condition, it becomes easy to make corrections corresponding to the change of the engine speed between the time of the intake air amount detection in the first mode and the time of the intake air amount detection in the second mode mentioned above, and the abnormality diagnosis of the variable valve mechanism 18 can be performed more accurately.

According to the above mentioned embodiment (the first embodiment), although the abnormality of the variable valve mechanism 18 is diagnosed by comparing the calculated exhaust gas returning amount (Q1'−Q2) with the estimated exhaust gas returning amount M, another embodiment (a second embodiment) is possible wherein the abnormality diagnosis of the variable valve mechanism is performed by estimating the variation amount between the intake air amounts in the first and second modes with the understanding that the intake air amount is changed corresponding to the exhaust gas returning amount in the second mode, estimating the intake air amount in the second mode based on the variation amount between the detected intake air amount in the first mode and the estimated intake air amount in the first mode, and comparing the detected intake air amount in the second mode with the estimated intake air amount in the second mode.

Figure 9:
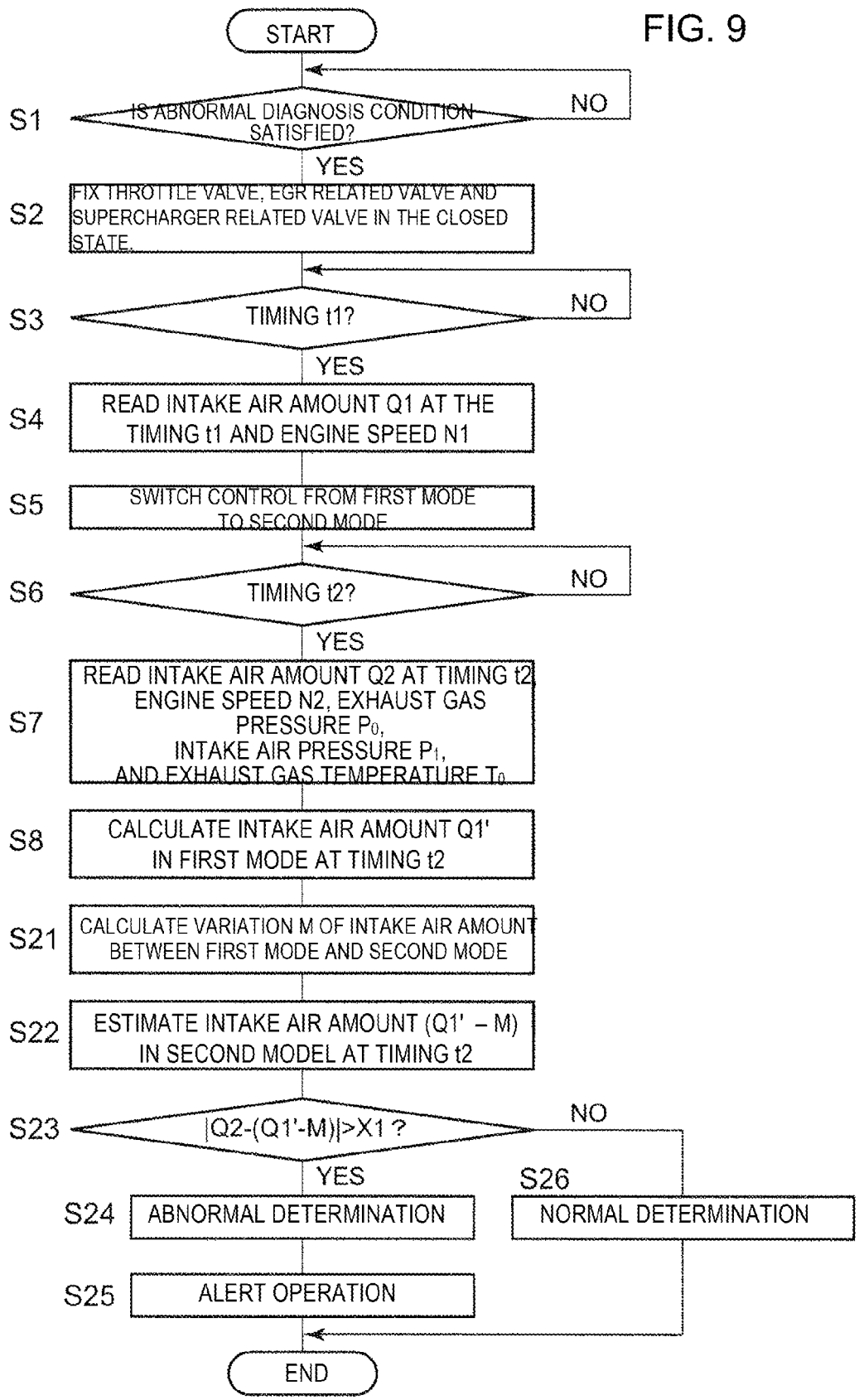
FIG. 9 shows a flowchart illustrating another abnormality diagnosis processing of the variable valve mechanism.

FIG. 9 shows a flowchart illustrating another abnormality diagnosis processing of the variable valve mechanism. In the abnormality diagnosis processing according to a second embodiment shown in FIG. 9 as well as the abnormality diagnosis processing according to the first embodiment shown in FIG. 8, although the control unit C performs the Steps from S1 to S8, after the intake air amount Q1' in the first mode of the timing t2 is calculated in the Step S8, the exhaust gas returning amount M when the operation of the exhaust valve 14 is performed in the second mode is calculated based on the exhaust gas pressure $P_0$, the intake air pressure $p_1$, and the exhaust gas temperature $T_0$ that are read in the Step S7, by using the estimate equation shown in Formula 1, and the variation amount M of the intake air amounts between the first mode and the second mode is estimated (Step S21) with as the understanding that the intake air amount in the second mode is changed corresponding to the calculated exhaust gas returning amount M.

When the variation amount M of the intake air amount in the second mode is estimated, the control unit C estimates the intake air amount (Q1'−M) in the second mode at the timing t2 (Step S22), based on the intake air amount Q1' in the first mode at the timing t2 calculated in the Step S8 and the variation amount M of the intake air amount calculated in the Step S21, by deducting the variation amount M of the variation between the intake air amounts in the first and second modes from the intake air amount Q1' in the first mode at the timing t2.

Moreover, it is determined whether the difference |Q2−(Q1'−M)| between the intake air amount Q2 in the second mode read in the Step S7 and the intake air amount (Q1'−M) in the second mode estimated in the Step S22 is larger than the diagnosis threshold value X1 (Step S23).

When the determination result in the step S23 becomes YES, that is, when the difference |Q2−(Q1'−M)| between the read intake air amount Q2 in the second mode and the estimated intake air amount (Q1'−M) in the second mode is larger than the diagnosis threshold value X1, the variable valve mechanism 18 is determined to be abnormal (Step S24), an alarm is operated, an alarm lamp 55 is turned on (Step S25), and the abnormality diagnosis is terminated.

On the other hand, when the determination result in the step S23 becomes NO, that is, when the difference |Q2−(Q1'−M)| between the read intake air amount Q2 in the second mode and the estimated intake air amount (Q1'−M) in the second mode is no more than the diagnosis threshold value X1, the variable valve mechanism 18 is determined to be normal (Step S26), and the abnormality diagnosis is terminated.

Moreover, in the abnormality diagnosis processing, although the variable valve mechanism 18 is determined to be abnormal when the difference |Q2−(Q1'−M)| between the intake air amount Q2 in the second mode and the estimated intake air amount (Q1'−M) in the second mode is larger than the diagnosis threshold value X1, the intake air amount (Q1−M) in the second mode is estimated based on the variation amount M between the intake air amount Q1 in the first mode and the intake air amount without correcting the intake air amount Q1 in the first mode and it is possible to determine that the variable valve mechanism 18 is abnormal, when the difference |Q2−(Q1−M)| between the intake air amount Q2 in the second mode and the estimated intake air amount (Q1−M) in the second mode is larger than the diagnosis threshold value X1 when, for example, the change of the engine speed is small enough, or when it can be determined that the correcting by the engine speed can be omitted in the relationship between the emission performance and the diagnosis accuracy.

In this way, the intake air amount Q1 in the first mode, the intake air amount Q2 in the second mode, and the exhaust gas pressure $P_0$ are detected, the variation amount M of the intake air amounts in the first mode and the second mode is estimated based on the exhaust gas pressure $P_0$ when the predetermined diagnosis condition is satisfied, the intake air amount (Q1−M) in the second mode is estimated based on the variation amount M between the detected intake air amount Q1 in the first mode and the estimated intake air amount, and when the difference |Q2−(Q1−M)| between the detected intake air amount Q2 in the second mode and the estimated intake air amount (Q1−M) in the second mode is larger than the diagnosis threshold value X1, it is possible to determine that the variable valve mechanism 18 is abnormal.

In such the case, by using the intake air amounts Q1 and Q2 in the first mode and the second mode and the variation amount M of the intake air amounts in the first mode and the second mode corresponding to the exhaust gas returning amount in the second mode that is estimated based on the exhaust gas pressure $P_0$, the abnormality diagnosis of the variable valve mechanism 18 can be performed taking into account the exhaust gas returning amount when the exhaust valve 14 is opened during the intake stroke, so that the abnormality diagnosis of the variable valve mechanism 18 that is configured to open the exhaust valve 14 even during the intake stroke can be performed accurately.

Moreover, since the higher the exhaust gas pressure is, the larger the variation amount M of the intake air amount is estimated to be, when the exhaust gas pressure is high, the difference between the exhaust gas pressure and the intake air pressure is high compared to when the exhaust gas pressure is low, so that the exhaust gas returning amount becomes large when the exhaust valve 14 is opened during the intake stroke. By reflecting this, the variation amount of the intake air amount can be estimated accurately and the effect is produced effectively. In addition, in the same way as the above mentioned first embodiment, if the exhaust gas returning amount is estimated based on the intake air pressure and the exhaust gas temperature, the variation amount of the intake air amount can be estimated more accurately.

Further, by correcting the intake air amount Q1 in the first mode based on the difference between the engine speed N1 when detecting the intake air amount in the first mode and the engine speed N2 when detecting the intake air amount in the second mode, and correcting the variation of the intake air amount between in the first mode and in the second mode, in the case that the engine speed when detecting the intake air amount in the first mode and the engine speed when detecting the intake air amount in the second mode are different, the intake air amount in the second mode can be calculated accurately and the abnormality diagnosis of the variable valve mechanism 18 can be performed more accurately. In addition, in the same way as the first embodiment, since the abnormality diagnosis is performed when the engine is in stable condition by stopping the recirculation of the EGR gas by the EGR device 45 and cutting the fuel supply, and the abnormality diagnosis processing is performed when the change of the engine speed is in stable condition during the fully closed deceleration from the high vehicle speed and high gear level, so that it becomes easy to correct corresponding to the change of the engine speed between the time of the intake air amount detection in the first mode and the time of the intake air amount detection in the second mode as mentioned above, and the abnormality diagnosis of the variable valve mechanism 18 can be performed more accurately.

The present invention should not be limited to the representative embodiments depicted herein. Various modifications and design changes can be made without departing from the spirit and scope of the invention.

INDUSTRIAL APPLICABILITY

Since the abnormality diagnosis of the variable valve mechanism that is configured to open the exhaust valve even during the intake stroke can be performed accurately according to the present invention as mentioned above, it may be used suitably in the production technology fields of diesel engines and vehicles that have such variable valve mechanisms.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

EXPLANATION OF REFERENCE CHARACTERS

1 Engine,
5 Cylinder,
8 Fuel injection valve,
13 Intake valve,
14 Exhaust valve,
18 Variable valve mechanism,
21 Intake passage,
23 Air flow sensor,
25 Throttle valve,
26 Intake air pressure sensor,
31 Exhaust passage,
32 Exhaust gas pressure sensor,
33 Exhaust gas temperature sensor,
45 EGR device,
51 Engine speed sensor,
52 Accelerator opening degree sensor,
53 Vehicle speed sensor,
54 Gear level detection sensor,
C Control unit

The invention claimed is:

1. An abnormality diagnosis device of a variable valve mechanism that is configured to be capable of selecting a first mode, which opens an exhaust valve only during an exhaust stroke or a second mode, which opens the exhaust valve during the exhaust stroke and also during an intake stroke, comprising:
   an intake air amount detection device for detecting an intake air amount flowing in an intake passage;
   an exhaust gas pressure detection device for detecting a pressure of an exhaust gas;
   an exhaust gas returning amount calculation device for calculating an exhaust gas returning amount that is recirculating into a cylinder from an exhaust passage in the second mode based on an intake air amount in the first mode detected by the intake air amount detection device and an intake air amount in the second mode when a predetermined diagnosis condition is satisfied;
   an exhaust gas returning amount estimation device for estimating an exhaust gas returning amount that is recirculating into the cylinder from the exhaust passage in the second mode based on the exhaust gas pressure detected by the exhaust gas pressure detection device when the predetermined diagnosis condition is satisfied; and
   an abnormality determination device for determining that the variable valve mechanism is abnormal when a difference between an exhaust gas returning amount calculated by the exhaust gas returning amount calculation device and an exhaust gas returning amount estimated by the exhaust gas returning amount estimation device is bigger than a diagnosis threshold value;
   wherein the exhaust gas returning amount estimation device estimates that the higher the exhaust gas pressure detected by the exhaust gas pressure detection device is, the larger the exhaust gas returning amount is.

2. The abnormality diagnosis device of the variable valve mechanism according to claim 1, comprising:
   an intake air pressure detection device for detecting an intake air pressure; wherein the exhaust gas returning amount estimation device estimates that the smaller the intake air pressure detected by the intake air pressure detection device is, the larger the exhaust gas returning amount is.

3. The abnormality diagnosis device of the variable valve mechanism according to claim 1, comprising:
   an exhaust gas temperature detection device for detecting an exhaust gas temperature;
   wherein the exhaust gas returning amount estimation device estimates that the lower an exhaust gas temperature detected by the exhaust gas temperature detection device is, the larger the exhaust gas returning amount is.

4. The abnormality diagnosis device of the variable valve mechanism according to claim 1, comprising:
   a fuel cutting device for stopping a fuel supply to an engine;
   wherein the abnormality determination device performs an abnormality determination of the variable valve mechanism when stopping the fuel supply to the engine by the fuel cutting device.

5. The abnormality diagnosis device of the variable valve mechanism according to claim 1, comprising:
   an EGR device for recirculating a part of the exhaust gas from the exhaust passage to the intake passage;
   wherein the abnormality determination device performs an abnormality determination of the variable valve mechanism when stopping the exhaust gas recirculation from the exhaust passage to the intake passage by the EGR device.

6. The abnormality diagnosis device of the variable valve mechanism according to claim 1, comprising:
   an engine speed detection device for detecting an engine speed;
   an exhaust gas returning amount correction device for correcting the exhaust gas returning amount, which is calculated by the exhaust gas returning amount calculation device, by correcting the intake air amount in the first mode detected by the intake air amount detection device to the intake air amount detected in the second mode, based on a difference between an engine speed when detecting the intake air amount in the first mode by the engine speed detection device and an engine speed when detecting the intake air amount in the second mode;
   wherein the abnormality determination device determines that the variable valve mechanism is abnormal when a difference between an exhaust gas returning amount corrected by the exhaust gas returning amount correction device and an exhaust gas returning amount estimated by the exhaust gas returning amount estimation device is larger than a diagnosis threshold value.

* * * * *